Sept. 26, 1944.   G. R. MOSS ET AL   2,358,873
APPARATUS FOR MAKING SCREEN PIPE
Original Filed April 5, 1938

G. R. MOSS
JOE F. MALONEY.
INVENTORS.

ATTORNEYS

Patented Sept. 26, 1944

2,358,873

UNITED STATES PATENT OFFICE 2,358,873

APPARATUS FOR MAKING SCREEN PIPE

Garner R. Moss and Joe F. Maloney, Houston, Tex., assignors to Emsco Screen Pipe Company, Houston, Tex., a corporation of Texas Original application April 5, 1938, Serial No. 200,088. Divided and this application March 20, 1942, Serial No. 435,515

5 Claims. (Cl. 80—12)

This application is a division of our prior copending application filed April 5, 1938, Serial No. 200,088, for Method of and apparatus for making screen pipe.

This invention relates to an apparatus for use in making screen pipe, and in carrying out other methods in which the outer surface of an externally cylindrical member is to be rolled.

The general object of this invention is to provide an apparatus which will make it possible to roll the exterior of a screen pipe or other member with a cylindrical outer surface without necessity of providing special or unusual expensive and complicated machinery.

This invention, while having other applications, relates particularly to the manufacture of screen pipe of the general type set forth in Patent No. 1,566,624 issued to Edward M. Smith on December 22, 1925. In making this pipe commercially it has in the past been customary first to mill grooves in the inner surface of the pipe beneath the location of each slot which was to be formed, these grooves, however, not passing entirely through the pipe. The slots would then be formed by sawing into the exterior surface of the pipe opposite each of the grooves that have been so milled, the saws used for this purpose being of a width designed to produce the width of slot desired for the screen being manufactured.

The foregoing process has proved fairly satisfactory for manufacturing screen pipe in which the slots in the finished pipe are as wide as 0.020 inch or more. However, when attempts have been made to utilize this process in manufacturing screen pipe having slots narrower than 0.020 inch, many difficulties have been encountered, and these increase as the width of the slot in the finished pipe decreases. It is necessary that these screens be made of exceedingly hard and tough steel or similar material because when used in deep wells such as are now common in the oil fields of the United States and other parts of the world, they are subjected to very great stresses and would readily be collapsed if made of less durable material.

Most of the difficulties heretofore encountered have resulted from the fact that the smaller gauges of saws employed in making the narrower slots do not have sufficient body to enable them to stand up in cutting the exceedingly hard and tough material of the usual steel pipes of which such screens are made. The result is that the saws frequently break during the process of sawing these slots. In making a 22 foot length of screen pipe having slots therein 0.008 inch wide, as many as five or six hundred saws would ordinarily be broken because they did not have the body to stand up in cutting these narrow slots. This not only involves great expense in the cost of saws, but each time a saw breaks it causes a flaw in the slot which it is cutting. That is, it tears out a portion of the material and makes it necessary to replace the material by welding or the like before the cutting of the slot can go forward with a new saw. When the openings thus torn by a saw just broken have been welded, there is no assurance even then that the material replaced by the weld will be as strong and serviceable as the material of the original pipe. In some cases it may be stronger and in others weaker. After the welding has taken place, a new saw must be mounted and the cutting of the slot proceeded with.

Due to the necessity for stopping the cutting operation at frequent intervals and making large numbers of welds to repair the portions of the pipe torn by broken saws, and due to the necessity for replacing the saws broken, the manufacture of screen in small gauges by this method has also consumed a great deal of time and due to its uncertainty the manufacturer has not been able to foretell how much time will be consumed in making a given amount of screen pipe.

In our aforesaid application a solution for this problem has been disclosed and claimed, which solution involves first sawing the slots to a wider gauge and then rolling the outer surface of the slotted pipe without reducing its inner diameter to partially close the slots. It may or may not thereafter be found necessary to resaw the slots to the desired gauge.

An object of this invention is therefore to provide an apparatus which is both simple and inexpensive, yet capable of efficiently carrying out certain of the steps of the method claimed in said prior application.

Another object is to provide apparatus which will make it possible to roll the outer surface of an elongated cylindrical member using a lathe of ordinary construction.

Other objects and advantages of this invention will become apparent from the following description taken in connection with the accompanying drawing, the same being by way of illustration and example only and not by way of limitation. This invention is to be limited in its scope only by the prior art and by the appended claims.

In accordance with our previous application referred to, the pipe of which the screen is to be formed is first milled on its inner surface in the same manner as was the previous practice. Then, if it be desired to produce a screen having a gauge narrower than experience has shown can be made by sawing the slots to gauge as in the previous practice, the slots instead of being sawed to gauge are sawed to some greater width which can be sawed without the difficulties above referred to. Suitable means is then employed for the purpose of upsetting the metallic body of the pipe adjacent the edges of the wide slots thus produced until these slots have a width not greater than the width which is desired for the finished slots.

Figure 1:
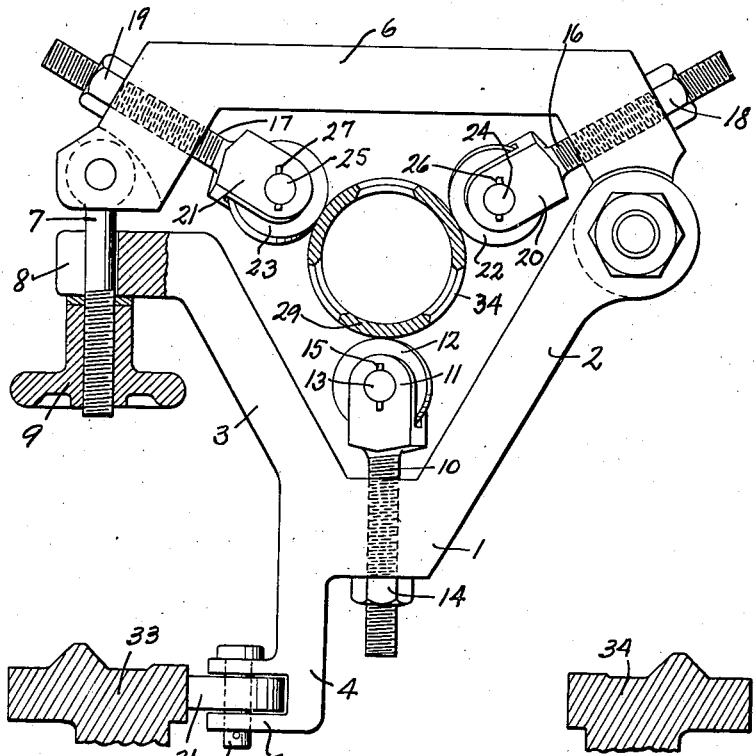
Fig. 1 is a transverse vertical cross sectional view, partly in elevation, illustrating the rolling operation forming a part of the method of this invention, and the apparatus used in connection therewith.
Figures 2, 3:
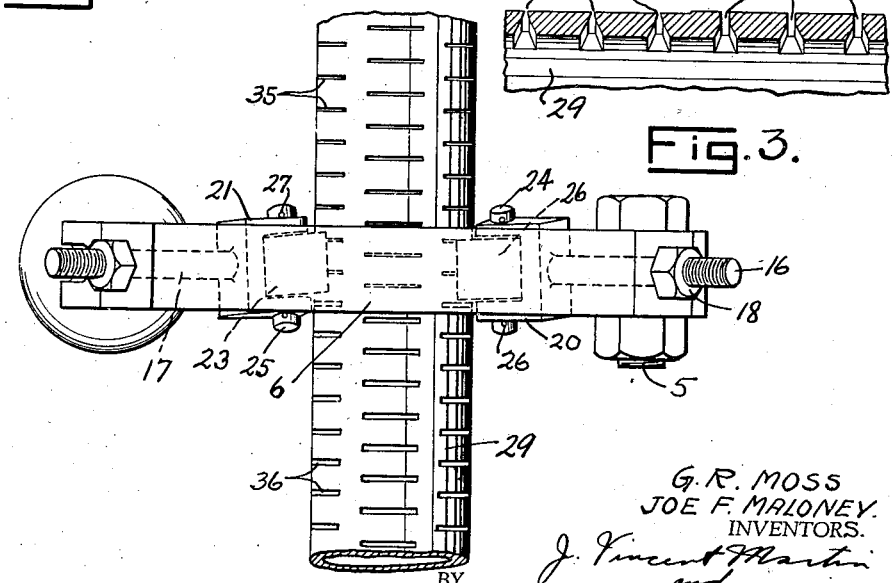
Fig. 2 is a top plan view of the apparatus shown in Fig. 1.
Fig. 3 is a longitudinal cross sectional view of a portion of a screen constructed in accordance with this invention.

For the purpose of performing this upsetting operation, this invention provides the equipment illustrated in Figs. 1 and 2 of the drawing. This equipment consists of a frame comprising a Y-member 1 having upwardly and outwardly directed arms 2 and 3, respectively, and having a downwardly extending leg 4. To the upper end of the arm 2 is pivotally connected by means of a bolt 5 or the like a third arm 6 capable of substantially closing the space between the upper ends of the arms 2 and 3. The opposite end of the arm 6 pivotally carries a bolt 7 adapted to be swung downwardly to enter a notch 8 in the upper end of the arm 3, and the arm 6 may then be secured in the position shown in Fig. 1 by means of a nut 9 or the like. Adjustably mounted in a threaded opening through the Y-member at the juncture of the arms 2 and 3 is a roller support member 10 which extends upwardly between the arms 2 and 3 and is provided with a bifurcated portion 11 within which is received a roller 12 suitably pivoted upon a shaft 13. This support may be locked in position by means of a lock nut 14 and the shaft 13 may be prevented from axial movement by a cotter key 15 or the like.

Similarly mounted adjacent the opposite extremities of the arm 6 are two other supports 16 and 17, respectively, these being locked in position by means of lock nuts 18 and 19, respectively, and having bifurcated portions 20 and 21 for receiving rollers 22 and 23. These rollers as in the previous instance are mounted upon shafts 24 and 25 which are secured in position by cotter keys 26 and 27.

It is to be noted that the shafts 10, 16 and 17 are so positioned that the rollers 12, 22 and 23 will be spaced from each other by substantially 120°.

The pipe 29 which has been milled and slotted with wide saws as previously explained and as shown at 36 is mounted in a lathe or the like and the frame just described is placed around the pipe and secured in closed position by means of the bolt 7 and the nut 9. It will be seen that the downwardly extending leg 4 of the Y-member has a laterally disposed bifurcated part 30 within which is received a roller 31 mounted upon a pin 32. This roller is so disposed and the leg 4 is of such length that it will engage the inside surface of one of the lathe ways 33 or 34, or some other surface along which it may move in a longitudinal direction but which will prevent it from rotating as the pipe 29 is rotated.

The supports 10, 16 and 17 are then adjusted so as to apply the rollers with a desired force against the outer surface of the pipe. These supports are also adjusted in such a manner that the axes of the rollers 12, 22 and 23 will be disposed at somewhat of an angle with respect to the axis of the pipe 29.

The pipe 29 is thereupon rotated and the rollers bearing against the outer surface thereof will upset the metal adjacent the slots which have been sawed and will narrow these slots. Due to the angular disposition of the rollers, the rollers and the frame in which they are carried will upon rotation of the pipe be moved longitudinally of the pipe so that the slots over the entire length of the pipe will be closed by substantially the same amount.

The result of this upsetting or slot closing operation as performed by the rollers just described is illustrated in the left hand portion of Fig. 3 where the slots closed by the rollers are indicated by numeral 35. These slots may in this operation be rolled to exactly the gauge desired. However, in the event it is so desired, the slots may be closed until they are narrower than the slots desired in the finished product and thereafter they may be sawed exactly to the gauge desired by saws of a width adapted to perform this function. In the latter case, the saws for sawing the pipe to gauge are not called upon to do a great deal of work such as they would be called upon to do if the slots had not previously been formed. Instead, they are simply called upon to widen the previously formed and rolled slots and bring them to exactly the width desired. It has been found in actual practice that this can be done and that the saws of a very narrow gauge still have sufficient body to enable them to stand up in this slot widening operation.

While apparatus described may, of course, be employed for rolling the exteriors of other cylindrical members, it has been found very efficient in practice and to assist greatly in carrying out the screen making process described in a rapid and efficient manner.

Means have therefore clearly been provided for carrying out the objects and advantages sought by this invention.

Having described our invention, we claim:

1. In an apparatus for rolling the exterior surface of a cylindrical member, a frame adapted to extend about and be supported substantially entirely by said member, a plurality of roller supports extending inwardly from said frame, a plurality of rollers mounted on said supports, respectively, and adapted to bear against the exterior surface of such cylindrical member, said frame having an arm extending laterally therefrom, and a roller on said arm adapted to contact a guide rail extending substantially parallel to the axis of the cylindrical member to prevent said frame from rotating while said cylindrical member is being rotated.

2. In an apparatus for rolling the exterior surface of a cylindrical member, a frame adapted to extend about and be supported substantially entirely by said member, said frame comprising separable hingedly connected parts whereby said frame may be spread to permit it to be placed about such cylindrical member, and means for securing said frame in closed position about such member, a plurality of roller supports extending inwardly from said frame, and a plurality of rollers mounted in said supports, respectively, on axes at equal acute angles to the plane of said frame and adapted to bear against the exterior surface of such cylindrical member.

3. In an apparatus for rolling the exterior surface of a cylindrical member, a frame adapted to extend about and be carried by said member and free to move in any direction to adjust itself to said member, and more than two non-tracking rollers carried by said frame and adapted to bear against the exterior surface of such cylindrical member, all of the said rollers having their axes inclined at equal angles with respect to the axis of said member, whereby when said frame and said member are rotated with respect to each other said frame will be caused to move longitudinally with respect to said member.

4. In an apparatus for rolling the exterior surface of a cylindrical member, a frame adapted to extend about and be carried by said member and free to move in any direction to adjust itself to said member, a plurality of roller supports extending inwardly from said frame, and more than two non-tracking rollers mounted in said supports, respectively, and adapted to bear against the exterior surface of such cylindrical member, all of the said rollers having their axes inclined at equal angles with respect to the axis of said member, whereby when said frame and said member are rotated with respect to each other, said frame will be caused to move longitudinally with respect to said member.

5. In an apparatus for rolling the exterior surface of a cylindrical member, a frame adapted to extend about said member, a plurality of roller supports extending inwardly from said frame and more than two non-tracking rollers mounted in said supports, respectively, and adapted to bear against the exterior surface of such cylindrical member, all of the said rollers having their axes inclined at equal angles with respect to the axis of said member, said frame having an arm extending laterally therefrom, and a roller mounted on said arm on an axis parallel to the plane of said frame, whereby when said member is mounted in a lathe said frame may be mounted on said member with said first mentioned rollers in contact with said member to roll the same as said member is rotated by the lathe, and said last mentioned roller may engage one of the ways of said lathe to prevent the frame from rotating while permitting it to move along the pipe.

GARNER R. MOSS.
JOE F. MALONEY.